United States Patent Office 3,423,427
Patented Jan. 21, 1969

3,423,427
SELECTIVELY SUBSTITUTED METHANE LEUCO DYES
Lawrence Anthony Cescon and Rolf Dessauer, Wilmington, and Catharine Elizabeth Looney, Centerville, Del., assignors to E. I. du Pont de Nemours and Company, Wilmington, Del., a corporation of Delaware
No Drawing. Continuation-in-part of application Ser. No. 290,648, June 26, 1963. This application Apr. 13, 1967, Ser. No. 630,534
U.S. Cl. 260—329             10 Claims
Int. Cl. D06p *1/00;* C09b *57/00;* C07d *65/00*

ABSTRACT OF THE DISCLOSURE

Leuco bis [4-disubstituted amino-2-ethyl (or fluoro or methyl) phenyl]-2-thienyl (or 2-furyl, 3,4-methylene-dioxyphenyl, 2-methoxy-4-($C_1$ to $C_8$) alkoxyphenyl) methanes, methanols, or cyanomethanes, leuco salts thereof; and dyes formed by the oxidation of the leuco dyes or their salts. The dyes are gray-to-black and of high tinctorial strength, making them useful as graphic art inks or pigment dyes. The leuco forms are useful in conjunction with photooxidants in imaging systems by conversion to the dye form when the oxidant is photolized. The leuco cyanomethanes can be converted to the dye form by direct photolysis and fixed with cyanuric derivatives or arylsulfonic acids. The leuco dyes are storage-stable, resisting air or heat-induced oxidation. They are prepared by conventional procedures.

CROSS-REFERENCES TO RELATED APPLICATIONS

This application is a continuation-in-part of application Ser. No. 290,648 filed June 26, 1963, and now abandoned.

BACKGROUND OF THE INVENTION

Field of the invention

This invention is directed to certain novel substituted methanes and the dyes obtained therefrom by oxidation. More particularly, it deals with bis(selectively substituted p-aminophenyl)-2-thienyl methanes and related methanes in which the 2-thienyl group is replaced by 2-furyl or selectively substituted phenyl. These methanes are each individually capable of forming, by simple oxidation processes, useful gray to black dyes hitherto unavailable.

Description of the prior art

Gray and black shades result from a broad adsorption of visible light and are not commonly attained by single pure dyes. Ideally, to have a neutral shade, a dye should absorb light uniformly in the visible region of the spectrum. In the spectrum of most of the known single organic dyes two or three absorption bands exist, but their positions and intensities are such that the shade imparted to articles dyed or printed with them is a chromatic color. Single dyes which are neutral in shade are generally weak, and much larger quantities of dye are required to produce a black dyeing than are needed to produce blue or red colorations of corresponding depth with the respective blue and red dyes. In order to obtain satisfactory deep gray or black shades, mixtures of dyes must be employed.

A single component gray to black dye would be valuable and have significant utility in the graphic arts and textile fields for a number of reasons. In printing applications particularly, a single component black dye is preferred to a black color formed by a mixture of dyes. The single dye can be used without changes of shade resulting from unequal rates of exhaustion of dye components from the ink supply, unequal rates of coloration depending on interaction of components with substrates, and off-shade fading because of differences in the light fastness of the component dyes.

In textile coloration, single component gray to black dyes are also preferred to dye mixtures because they obviate concern with unequal exhaustion from the dye bath, unequal application properties depending on dye component-substrate interaction, unequal fading of components, and off-shade discoloration as a result of laundering or dry cleaning. These latter processes can also affect the components of a dye mixture differently.

In textile dyeing with aromatic amine salts like aniline hydrochloride, a black color can be developed by oxidation. The oxidation of the aromatic amine salt must be carefully taken to the proper stage to avoid off-shades which result from either over- or under-oxidation. Even then, the resultant black dye is a complex mixture of oxidation products which individually are susceptible to varying rates of change by laundering and the action of sunlight and thus cause alterations in the color as do the components of a dye formed by mixing selected colors to give black.

From the foregoing, it is seen that it is clearly desirable to utilize single component gray to black dyes which have high tinctorial strength, if these are available. Dyes of high tinctorial strength are found in the realm of basic dyes, and, particularly, in the area of triaryl methane derivatives. However, true gray and black shades have not, hertofore, been produced by a single dye of this family. In Venkataraman's Synthetic Dyes, Academic Press, Inc., New York, 1952, p. 722, it is stated: "I claim that blue-black to green-black dyes are obtained when aromatic polyaldehydes, e.g. terephthalaldehyde, or substances which react like aromatic dialdehydes are condensed with secondary or tertiary aromatic amines and the leuco compounds oxidized in the presence of mineral acids. Such deep shades have not so far been obtained with basic dyes of the triphenylmethane class; on the other hand, it has been stated that by condensing terephthaloyl chloride with dimethyl- or diethylaniline, bistriphenylmethane dyes (di-positively charged dyes) are produced which are somewhat yellower in shade than Malachite Green."

It is an object of this invention to provide novel compounds which upon oxidation yield monocomponent dyes of gray and black shades of high tinctorial strength and stability, and which have improved storage stability in imaging compositions containing oxidant precursors.

SUMMARY OF THE INVENTION

The novel compounds of this invention comprise the bis[4-disubstitutedamino-2-ethyl (or fluoro or methyl) phenyl]-2-thienyl (or 2-furyl, 3,4-methylenedioxyphenyl, 2-methoxy-4-($C_1$ to $C_8$) alkoxy phenyl, or 3,4-di ($C_1$ to $C_8$) alkoxyphenyl) methanes, methanols, or cyanomethanes; salts of these compounds; and dyes formed by the oxidation of these compounds or their salts. The thienyl and furyl may bear an ethyl or methyl substituent in the 4- or 5-position.

More specifically, the present invention is directed to a compound having the formula

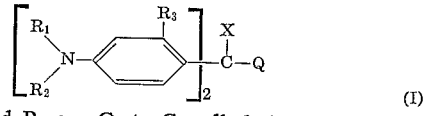

(I)

wherein $R_1$ and $R_2$ are $C_1$ to $C_{12}$ alkyl, 2-cyanoethyl, 2-hydroxy-ethyl, 3-hydroxypropyl, $C_1$–$C_4$ alkoxy ($C_1$–$C_4$) alkyl, $C_7$–$C_{12}$ aralkyl, or $C_6$–$C_{14}$ aryl; $R_3$ is methyl, ethyl, or fluorine; X is hydrogen, hydroxy, or cyano; Q is 2-thienyl, 2-furyl, 3,4-methylenedioxyphenyl, 2-methoxy-4-

($C_1$ to $C_8$) alkoxyphenyl, or 3,4-di($C_1$ to $C_8$)-alkoxyphenyl; the salts of organic and inorganic acids thereof; and the catonic oxidation products of said compounds or their salts. A compound according to this structure (I) wherein $R_3$ is methyl represents a preferred embodiment.

The present invention also includes compounds having the formula

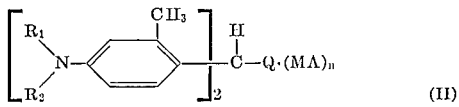

(II)

wherein $R_1$, $R_2$, and Q are as defined in structure (I), M is hydrogen or zinc, A is an anion, preferably of valence $-1$ to $-3$, and $n$ is an integer 1 or 2.

Another embodiment of this invention is a dye having the formula

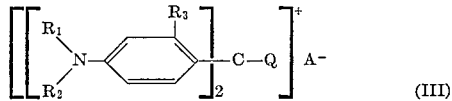

(III)

wherein $R_1$, $R_2$, $R_3$, and Q are as defined in structures (I) and $A^-$ is an anion, preferably of valence $-1$ to $-3$.

The compounds of Formulas I and II comprise the leuco form of the dye, while the compounds of Formula III represent the colored form. The dyes of this invention are single component coloring products which impart gray to black shades to fibers such as cotton, silk, acrylic fiber, to leather, and to paper in any of its many forms.

The novel leuco dyes and their salts provide colorless materials which can be conveniently and selectively converted to colored materials. Thus, they have application in areas where rapid, simple color changes are desired, as in photochemical image forming systems as described below.

DETAILED DESCRIPTION OF THE INVENTION

The compounds of the invention

In Formulas I–III because of availability, the $R_1$ and $R_2$ aralkyl and aryl groups are preferably phenylalkyl or napthylalkyl where the alkyl group is 1–4 carbons and phenyl or napthyl respectively. Most preferably $R_1$ and $R_2$ are each lower alkyl (alkyl of 1–4 carbon atoms).

Representative colorless leuco dyes of this invention include:

(1) Bis[4-bis(2-cyanoethyl)amino-o-tolyl](3,4-dibutoxyphenyl)methane.
(2) Bis[4-bis(2-cyanoethyl)amino-o-tolyl]2-furylmethane.
(3) Bis[4-bis(2-hydroxyethyl)amino-2-fluorophenyl]2-furylmethane.
(4) Bis[4-bis(2-hydroxyethyl)amino-o-tolyl]3,4-dioctyloxyphenyl)cyanomethane.
(5) Bis[4-bis(2-hydroxyethyl)amino-o-tolyl]2-furylcyanomethane.
(6) Bis[4-bis(3-hydroxypropyl)amino-o-tolyl](2-methoxy-4-octyloxyphenyl)methane.
(7) Bis[4-bis(2-methoxyethyl)amino-o-tolyl](3,4-methylenedioxyphenyl)methane.
(8) Bis(4-dibenzylamino-o-tolyl)2-thienylmethane.
(9) Bis(4-didodecylamino-o-tolyl)2-furylmethane.
(10) Bis(4-diethylamino-2-ethylphenyl)2-furylmethane.
(11) Bis(4-diethylamino-2-fluorophenyl)2-furylmethanol.
(12) Bis(4-diethylamino-2-fluorophenyl)2-thienylmethane.
(13) Bis(4-dimethylamino-2-ethylphenyl)(3,4-methylenedioxyphenyl)methane.
(14) Bis(4-dimethylamino-2-ethylphenyl)2-thienylcyanomethane.
(15) Bis(4-dimethylamino-2-fluorophenyl)(2,4-dimethoxyphenyl)methanol.
(16) Bis(4-dimethylamino-o-tolyl)(2,4-dimethoxyphenyl)-methane.
(17) Bis(4-dimethylamino-o-tolyl)(3,4-dibutoxyphenyl)-methane.
(18) Bis(4-dimethylamino-o-tolyl)(3,4-dimethoxyphenyl)-methane.
(19) Bis(4-dimethylamino-o-tolyl)2-thienylmethane.
(20) Bis[4-(N-ethylanilino)-o-tolyl](3,4-methylenedioxyphenyl)cyanomethane.
(21) Bis(4-diethylamino-o-tolyl)(3,4-methylenedioxyphenyl)-methane.
(22) Bis(4-diethylamino-o-tolyl)(2,4-dimethoxyphenyl)methane.
(23) Bis(4-diethylamino-o-tolyl)-2-furylmethane.
(24) Bis(4-diethylamino-o-tolyl)(2-methoxy-4-butoxyphenyl)-methanol.
(25) Bis(4-diethylamino-o-tolyl)2-thienylmethane.
(26) Bis[4-([2-cyanoethyl][2-hydroxyethyl]amino)-o-tolyl]-2-thienylmethane.
(27) Bis[4-bis(2-ethoxyethyl)amino-2-fluorophenyl]2-furylcyanomethane.
(28) Bis[4-bis(4-butoxybutyl)amino-o-tolyl]2-thienylmethane.
(29) Bis[4-(N-methyl-N-naphthylamino)-o-tolyl](2,4-dimethoxyphenyl)methane.

It is to be understood that the corresponding organic and inorganic salts (Formula II) and oxidized dye salts (Formula III) of the foregoing leuco dye compounds are also a part of this invention. Representative salts ($MA^-$ and $A^-$) of the foregoing leuco dyes include the chloride, hydrochloride, zinc chloride, oxalate, p-toluenesulfonate, phosphotungstate salts, and the like.

The choice of salt type is dependent on the use to be made of the leuco dyes and their oxidation products. When high water solubility is desired, the chloride dyes, or the leuco dye hydrochlorides are preferred. When water insolubility is desired, the phosphotungstate salts of these dyes are preferred. The latter and other heteropoly acid salts are also more lightfast than the chloride salt of the dyes.

The critical feature of the present novel class of compounds which makes them novel and capable of providing significantly useful colors of gray and black shades is the ethyl, fluoro, or methyl substituent in the 2-position in combination with the disubstituted groups in the 4-position of the two phenyls taken together with one of the designated Q groups. The pronounced and unexpected effect of this combination of substituents is illustrated in the examples below.

The cationic substituted methane dyes obtained from the triphenyl- or (diphenylthienyl or furyl)- methanes, methanols and cyanomethanes of this invention are purposely represented by Formula III with an apparent trivalent methane carbon atom in recognition of the resonance shifts of electrons that exist in compounds of this type. Several electronic configurations are possible as shown by Krahler in The Chemistry of Synthetic Dyes and Pigments, American Chemical Society Monograph No. 127, page 229, Reinhold Publishing Co., 1955.

The utility of the compounds of the invention

The dyes of the present invention have high tinctorial strength. They can be used on textiles as gray-to-black self-shades without mixtures of other dyes, thus obviating many of the difficulties of mixed shade dyeing. Their high tinctorial value, and attractive shades make them useful in graphic arts applications, where the brilliance of the conventional triarylmethane dyes, such as Malachite Green, Crystal Violet, and Victoria Blue is disadvantageous because of the unattractive contrast of these colors with papers of nearly every hue. The dyes of this invention are thus particularly valuable in printing inks, hectograph compositions, and inks for typewriter ribbons and mimeograph stencils.

Furthermore, the present novel leuco compounds have significant utility in photochemical oxidation processes; for example, the photolysis of hexaarylbiimidazoles on paper treated with the heretofore described novel leuco dyes leads to gray-to-black images in the exposed areas. With a given amount of leuco dye the density of color is proportional to the amount of radiation. Such a bi-imidazole-initiated imaging process is more fully described in British Patent 1,047,569, published Nov. 9, 1966. The leuco dyes of this invention are also useful in other photochemical image forming processes, including those in which color is generated when a leuco dye is irradiated in the presence of a halocarbon, such as carbon tetrabromide, hexachloroethane, and the like (see for example Wainer, U.S. 3,042,515).

The leuco cyanomethanes of this invention become colored on irradiation with ultraviolet light. In solution the leuco cyanomethanes are phototropic, i.e., the color is discharged after standing in the dark. On some substrates, or in the presence of certain anions, such as arylsulfonic acids, these leuco cyanomethanes form permanent color. Particularly useful compounds for producing a permanent color with the leuco cyanomethanes are cyanuric acid compounds, including cyanuric acid and cyanuric chloride, but especially cyanuric esters as disclosed in U.S. 3,079,258.

A significant feature of this invention is that the novel leuco dyes have good resistance to thermal or air-induced oxidation (color-formation) when compositions containing them and oxidant precursors, such as those mentioned above, are stored under ordinary conditions in the dark. This is important in the fields of photocopying, photoduplication, microimaging and classical photography, which require that light-sensitive compositions to be practical, should undergo essentially no color change under ordinary darkroom storage conditions and yet retain the ability to form color under photoimaging conditions. Prior art systems involving aminotriaryl methanes as the color-forming component are not entirely satisfactory in this respect and tend to undergo color-forming dark reactions which lead to fogging or coloration of photographic films and papers. A principal factor responsible for such undesirable dark reactions is believed to be air oxidation. Although it is often possible to prevent such undesirable reactions by storing the compositions in the absence of air, such anaerobic conditions are difficult and costly to maintain and are impractical in the modern practice of the photographic arts. To improve the dark-storage stability of photosensitive compositions involving aminotriarylmethanes, U.S. Patent 3,042,515 suggests incorporating alkylamines or zinc oxide. Such use, however, entails extra materials' handling. Also, the amine bases, being relatively volatile, are malodorous, while the solid bases, generally opaque, make difficult the preparation of haze-free photosensitive compositions.

Preparation of compounds and dyes.—The compounds of this invention are synthesized by various procedures which have been employed for the preparation of triarylmethane dyes. Of these procedures the following are mentioned as representative of those by which the invention compounds are prepared.

(a) The condensation of 2-thiophenecarboxaldehyde, 2-furaldehyde, piperonal, 2-methoxy-4-alkoxybenzaldehyde, or 3,4-dialkoxybenzaldehyde with an N,N-disubstituted-3-methyl(or ethyl or fluoro)aniline:

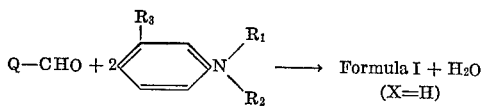

wherein Q and the R's above as well as in the equations below have the same significance as set forth earlier in the specification.

(b) The condensation of an acetal of the aldehydes named in (a) above with an N,N-disubstituted-m-toluidine:

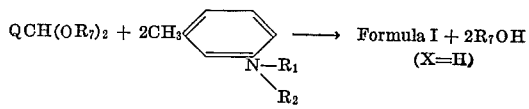

wherein $R_7$ is methyl or ethyl.

The substituted methanols are prepared by oxidizing the methane derivatives in an alkaline medium. They are also prepared by making alkaline an aqueous solution of the corresponding dye. The substituted cyanomethanes are prepared by treating the oxidized methane derivatives with an alkali metal cyanide.

The present novel substituted methanes, methanols, and cyanomethanes are readily converted to the corresponding dyes by chemical or photochemical processes. Among the chemical processes for converting the substituted methanes to the corresponding dyes are oxidation with lead dioxide ($PbO_2$), chloranil, sodium dichromate, manganese dioxide, and nitrosyl sulfuric acid in aqueous solution or a solution with an organic solvent. Both the substituted methanols and cyanomethanes are converted to the corresponding dyes by acid hydrolysis. A photochemical process of producing dye consists of exposing to ultraviolet light a mixture of the leuco dye of this invention and a photooxidant preferably in the presence of a small amount of solvent. Another process consists of irradiating a mixture of the substituted cyanomethanes and a cyanuric acid compound.

Some of the dyes of this invention may also be prepared directly from an appropriately substituted phenone and an N,N-dialkyl-m-toluidine:

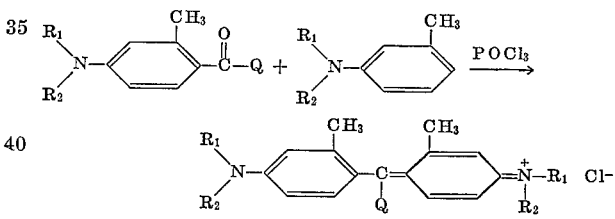

wherein Q and the R's represent the same groups as heretofore defined.

The invention dyes may be converted to insoluble salts, referred to as pigment dyes, for the direct coloring or printing of textile fibers and fabrics and for use as pigments for coating compositions by treatment with such an acid as phosphotungstic, phosphomolybdic, phosphotungstomolybdic, and the like. Usually, the dyes exist in a water-soluble cationic form with an anion to balance the positive charge residing in the dye configuration. This anion is obtained from inorganic and organic acids such as, for example, hydrochloric, hydrobromic, hydrofluoric, phosphoric, sulfuric, oxalic, p-toluenesulfonic. The anion may also result from the formation of a zinc chloride complex. This same group of inorganic and organic acids is also used to form salts of the colorless leuco form of the dyes of this invention.

The examples

The following examples are representative and all parts and percentages mentioned are by weight.

EXAMPLE 1

Bis(4 - diethylamino - o - tolyl)(3,4 - methylenedioxyphenyl)methane

A reactor is charged with 28 parts of isopropyl alcohol, 15 parts of piperonal, and 32.6 parts of N,N-diethyl-m-toluidine. The solution is agitated under nitrogen while 16.2 parts of 98% sulfuric acid is gradually added at a temperature between 30° and 40° C. followed by the addition of 8.4 parts of urea. The reaction mass is heated at 75° C. for four hours and cooled to room temperature.

It is then drowned in 400 parts of ice water and the resulting solution is made alkaline to Brilliant Yellow paper with 30% sodium hydroxide solution. The precipitate is collected, washed with water, and slurried in methanol in the presence of activated charcoal. The resultant mixture is filtered. Evaporation of solvent affords 36.8 parts of cream colored powder which is bis(4-diethylamino-o-tolyl)(3,4-methylene-dioxyphenyl)methane.

Dihydrochloride salt 10.0 parts of the above leuco dye base are slurried in 150 parts of carbon tetrachloride at room temperature, and anhydrous hydrogen chloride is added until no further addition takes place. The off-white solid changes to a gummy precipitate during this period. The solvent is decanted from this precipitate, and then washed with dry ethyl ether. It is then ground in a mortar under ether, to give 11.25 parts of a white powder, which is the dihydrochloride of bis(4-diethylamino-o-tolyl)(3,4-methylenedioxyphenyl)methane.

The above leuco dye dihydrochloride is photochemically oxidized on paper when the latter is immersed briefly in a solution prepared as described below, dried by infrared heat to remove most of the solvent, and irradiated with light of 2537 to 4200 A. A gray to black color results on the irradiated portions, the intensity of the color being a function of the amount of irradiation. The photosensitive composition consisted of:

1 part leuco dye dihydrochloride,
1 part dimer of 2-(o-chlorophenyl)-4,5-diphenyl-imidazolyl,
20 parts methanol,
78 parts dimethylformamide.

Another method of photolytically generating color consists of dissolving 1 part of the leuco dye base in 50 parts of carbon tetrabromide, and immersing paper therein for a brief time. Upon drying the paper and irradiating it with light of 2537 A. to 3100 A. a gray to black image results.

A further method of producing color by irradiating a photosensitive composition with ultraviolet light comprises dissolving one part of the cyanomethane derivative of the leuco dye of this example (prepared as described below) and 15 parts of triallylcyanurate in a mixture of 59 parts of dioxane and 25 parts of a 20% solution of cellulose acetate butyrate in a 50–50 mixture of toluene and ethyl acetate. The composition is applied to paper and dried. On exposure to ultraviolet light a gray to black color is formed. Besides triallylcyanurate may be used a cyanuric acid compound having the formula

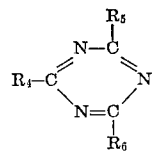

wherein $R_4$, $R_5$, and $R_6$ are hydroxy, chlorine, or OY wherein Y is alkyl, alkenyl, cycloalkyl, aryl, aralkyl or alkaryl having up to 18 carbon atoms, and preferably where the R groups are the same in any given compound. This group of compounds includes cyanuric acid, cyanuric chloride, trimethylcyanurate, triethylcyanurate, tributylcyanurate, tricyclohexylcyanurate, triphenylcyanurate, tritolylcyanurate, tribenzylcyanurate.

Oxalate salt

To a solution of 5.4 parts of the subject bis(4-diethylamino-o-tolyl)(3,4-methylenedioxyphenyl)methane in 40 parts of methanol is added a solution of 3.8 parts of oxalic acid dihydrate in 40 parts of methanol. A resinous precipitate forms at once and is isolated for trituration with ethyl ether whereupon a crystalline white solid forms. This is the dioxalate salt of bis(4-diethylamino-o-tolyl)(3,4-methylenedioxyphenyl) methane.

p-Toluenesulfonate salt

The p-toluenesulfonic acid salt of the leuco dye of this example is prepared by a procedure similar to that employed to form the oxalate, using p-toluenesulfonic acid. It is a crystalline, white solid.

Phosphotungstate salt

One part of the leuco dye of this example is dissolved in a solution of one part of glacial acetic acid in 104 parts of water at 85° C. To this solution is added a hot solution of four parts of sodium tungstate, 0.35 part of disodium phosphate heptahydrate and three parts of 36% hydrochloric acid in 50 parts of water, and the mixed solutions are heated at the boiling point for five minutes. Upon cooling, the insoluble phosphotungstate salt precipitates. It is isolated and washed with water. It dries to a white powder. When dissolved in dimethylformamide to give a 1% solution and applied to paper, the paper is uncolored but upon oxidation with chloranil a gray dye rapidly develops.

Zinc chloride salt

Twenty parts of the leuco dye of this example are dissolved in 40 parts of water to which 1.2 parts of 36% aqueous hydrochloric acid have been added. To the resultant solution are gradually added 11 parts of zinc chloride dissolved in 20 parts of water. On cooling the mixture the mono zinc chloride derivative of bis(4-diethylamino-o-toyly)(3,4-methylenedioxyphenyl)methane precipitates and is dried to give 3.5 parts of white product. The product is oxidized with lead dioxide to give a black dye which imparts a gray color to paper.

Oxidation dye product 1.6 parts of the leuco dye of this example is dissolved in 25 parts of 1.7% aqueous hydrochloric acid solution at 25° C. and mixed with 0.67 part of lead dioxide. After about three minutes three parts of sodium chloride is added, and the reaction mass is agitated for 30 minutes and filtered. The press cake is dissolved in ten parts of water. 0.17 part of sodium sulfate is added, the mixture is agitated for 30 minutes, the lead sulfate is separated by filtration, and the dye product is precipitated by the addition of 10% sodium chloride solution. The precipitated dye is collected and dissolved in methanol to separate it from any inorganic material. Evaporation of the solvent yields one part of a black powder which in 0.5% aqueous solution colors paper a gray shade. Absorption spectra in methanolic solution show maxima at 659 mµ and 489 mµ in a ratio of 2.6:1.

This dye and related dyes are useful in hectograph compositions. A mixture of 40 parts of the oxidized leuco dye, bis(4-diethylamino-o-tolyl)(3,4-methylenedioxyphenyl)methane, 40 parts of carnuba wax, and 20 parts of petroleum jelly is rubbed fine, melted at a temperature of about 80° C., and applied as a coating to paper to provide a hectograph master sheet. This master sheet is then used in conventional spirit duplicating devices, and dye is transferred to the duplicate sheet by means of volatile alcohol transfer media to give desirable black images.

Phosphotungstate dye pigment

One part of the above oxidation dye product is dissolved in 104 parts of water containing one part of glacial acetic acid and treated with sodium tungstate and sodium phosphate under the conditions described above for preparing the phosphotungstate salt of the dye in the reduced state. The dry, black powdery product is the phosphotungstate dye pigment. It is insoluble in water, but dissolves in dimethylformamide to provide a solution with which paper is dyed gray.

Bis(4-diethylamino-o-tolyl)(3,4-methylenedioxyphenyl) methanol

The oxidation dye product in the amount of one part is dissolved in 200 parts of water. The solution is heated to 50° C. and gradually added to 264 parts of 30% aqueous sodium hydroxide solution. When the addition is complete the resultant solution is agitated for about an hour and cooled. The precipitated material, collected and dried at 50° C., amounts to one part of product having the formula

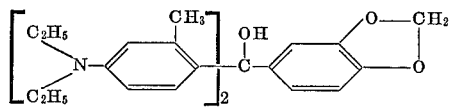

The presence of the OH group is confirmed by infrared analysis. An acetone solution of the product is essentially colorless. By hydrolysis in acid the original gray dye is obtained.

Bis(4-diethylamino-o-tolyl)(3,4-methylenedioxyphenyl) cyanomethane

The oxidation dye product of Example 1 in an amount of two parts is dissolved in 100 parts of water, and the solution is blanketed with nitrogen. To the solution is then added 0.4 part of potassium cyanide, and the mixture is agitated for four hours. The precipitate that forms is isolated, washed, and dried and yields 1.4 parts of white powder which has the formula

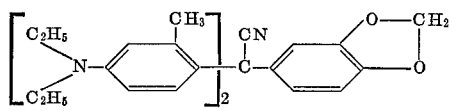

Infrared analysis confirms the presence of the

group. When a colorless methanol/dimethylformamide solution is applied to paper it produces a colorless spot which on irradiation with ultraviolet light slowly turns gray.

EXAMPLE 2

Bis(4-diethylamino-o-tolyl)(3,4-dimethoxyphenyl) methane

By the procedure of Example 1, 8.3 parts of 3,4-dimethoxybenzaldehyde and 16.3 parts of N,N-diethyl-m-toluidine are reacted to form the above-named compound as a cream colored powder. This product is oxidized with lead peroxide to a black dye, which imparts a gray color to paper treated with an aqueous methanolic solution of it.

EXAMPLE 3

Bis(4-diethylamino-o-ethylphenyl)(3,4-methylenedioxyphenyl)methane

By the procedure of Example 1, 8 parts of piperonal and 16 parts of N,N-diethyl-m-ethylaniline are reacted to form the above-named compounds as 12 parts of a white powder, which on oxidation affords a gray-to-black dye, which imparts a gray color to paper when dyed with an aqueous solution.

EXAMPLE 4

Bis(4-diethylamino-o-fluorophenyl)(3,4-methylenedioxyphenyl)methane

By the procedure of Example 1, 8 parts of piperonal and 16 parts of N,N-diethyl-m-fluoroaniline are reacted to form a white crystalline powder which is the above-named compound. On oxidation a black powder is formed. An aqueous methanolic solution of the latter imparts a gray color to paper.

EXAMPLE 5

Bis(4-diethylamino-o-tolyl)(2,4-dimethoxyphenyl) methane

By the procedure of Example 1, 8.3 parts of 2,4-dimethoxybenzaldehyde and 16.3 parts of N,N-diethyl-m-toluidine are reacted to form the above-named compound as a white crystalline powder. The product is oxidized with lead dioxide to a black dye which imparts a gray color to paper treated with a water or methanol solution of it.

EXAMPLE 6

Bis(4-diethylamino-o-tolyl)2-furylmethane

By the procedure of Example 1, 4.8 parts of 2-furaldehyde and 16.3 parts of N,N-diethyl-m-toluidine are reacted to provide 15 parts of the above-named product as a gray powder which, on purification by the usual procedure, gives a product having the formula

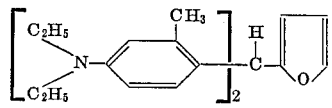

with the following analysis:
Calculated for $C_{27}H_{36}N_2O$: C=80.2 percent; H=9.0 percent; N=6.9 percent. Found: C=80.2 percent; H=9.1 percent; N=7.0 percent.

Upon oxidation with lead dioxide this leuco dye yields a black dye which imparts a gray color to paper. This dye has absorption maxima at 635 m$\mu$ and 510 m$\mu$ in the ratio of 2.3:1.

EXAMPLE 7

Bis(4-diethylamino-o-tolyl)2-thienylmethane

As in the preceding examples, 5.6 parts of 2-thiophenecarboxaldehyde and 16.3 parts of N,N-diethyl-m-toluidine are reacted to form 18.1 parts of the above-named leuco dye having the following analysis.
Calculated for $C_{25}H_{30}N_2S$: C=77.0 percent; H=8.5 percent; N=6.7 percent. Found: C=77.2 percent; H=8.6 percent; N=6.2 percent.

On oxidation is formed a black dye which colors paper gray to black.

Oxalate salt

To a solution of 5.4 parts of the bis(4-diethylamino-o-tolyl)2-thienylmethane in 40 parts of methanol is added a solution of 3.8 parts of oxalic acid dihydrate in 40 parts of methanol. A resinous precipitate forms at once and is isolated for trituration with ethyl ether whereupon a crystalline white solid forms. This is the dioxalate salt of the above-named leuco dye.

p-Toluenesulfonate salt

The p-toluenesulfonic acid salt is prepared by a procedure similar to that employed to form the oxalate using p-toluenesulfonic acid. The salt is a crystalline, white solid.

Phosphotungstate salt

One part of the leuco dye of this example is dissolved in a solution of one part of glacial acetic acid in 104 parts of water at 85° C. To this solution is added a hot solution of four parts of sodium tungstate, 0.35 part of disodium phosphate heptahydrate and three parts of 36% hydrochloric acid in 50 parts of water, and the mixed solutions are heated at the boiling point for five minutes. Upon cooling, the insoluble phosphotungstate salt precipitates. It is isolated and washed with water. It dries to a white powder. When dissolved in dimethylformamide to give a 1% solution and applied to paper, the paper is uncolored but upon oxidation with chloranil a gray dye rapidly develops.

Zinc chloride salt

Twenty parts of the leuco dye of this example are dissolved in 40 parts of water to which 1.2 parts of 36% aqueous hydrochloric acid have been added. To the resultant solution is gradually added 11 parts of zinc chloride dissolved in 20 parts of water. On cooling the mixture the mono zinc chloride derivative of bis(4-diethylamino-o-tolyl)2-thienylmethane precipitates and is dried to give three parts of white product. The product is oxidized with lead dioxide to give a black dye which imparts a gray color to paper.

Oxidation dye product 1.6 parts of the leuco dye of this example is dissolved in 25 parts of 1.7% aqueous hydrochloric acid solution at 25° C. and mixed with 0.67 part of lead dioxide. After about three minutes, three parts of sodium chloride is added and the reaction mass is agitated for 30 minutes and filtered. The press cake is dissolved in ten parts of water. 0.17 part of sodium sulfate is added, the mixture is agitated for 30 minutes, the lead sulfate is separated by filtration, and the oxidized dye product is precipitated by the addition of 10% sodium chloride solution. The precipitated dye is collected and dissolved in methanol to separate it from any inorganic material. Evaporation of the solvent yields one part of a black powder which in 0.5% aqueous solution colors paper a gray shade. The dye has absorption maxima at 659 m$\mu$ and 489 m$\mu$ in the ratio of 2.6 to 1.

Bis(4-diethylamino-o-tolyl)2-thienylmethanol

The oxidation dye product in the amount of one part is dissolved in 200 parts of water. The solution is heated to 50° C. and gradually added to 264 parts of 30% aqueous sodium hydroxide solution. When the addition is complete the resultant solution is agitated for about an hour and cooled. The precipitated material, collected and dried at 50° C., amounts to one part of product having the formula

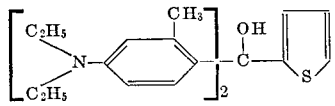

The presence of the OH group is confirmed by infrared analysis. An acetone solution of the product is essentially colorless. By hydrolysis in acid the original gray dye is obtained.

Bis(4-diethylamino-o-tolyl)2-thienylcyanomethane

The oxidation dye product in an amount of two parts is dissolved in 100 parts of water, and the solution is blanketed with nitrogen. To the solution is then added 0.4 part of potassium cyanide, and the mixture is agitated for four hours. The precipitate that forms is isolated, washed, and dried and yields 1.4 parts of white powder which has the formula

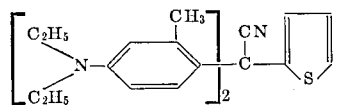

Infrared anaylsis confirms the presence of the

group. When a colorless methanol/dimethylformamide solution is applied to paper it produces a colorless spot which on irradiation with ultraviolet light slowly turns gray.

This dye is useful in hectograph compositions. A mixture of 40 parts of the oxidized leuco dye, 40 parts of carnauba wax, and 20 parts of petroleum jelly is rubbed fine, melted at a temperature of about 80° C., and applied as a coating to paper to provide a hectograph master sheet. This master sheet is then used in conventional spirit duplicating devices, and dye is transferred to the duplicate sheet by means of volatile alcohol transfer media to give desirable images.

Phosphotungstate dye pigment

One part of the above dye is dissolved in 104 parts of water containing one part of glacial acetic acid and treated with sodium tungstate and sodium phosphate under the conditions described in Example 1.

The dry, black powdery product is the dye pigment. It is insoluble in water, but dissolves in dimethylformamide to provide a solution with which paper is dyed gray.

EXAMPLE 8

Bis[4-([2-cyanoethyl] [2-hydroexyethyl]amino)-o-tolyl]-2-thienylmethane

By the procedure of Example 1, 5.6 parts of 2-thiophenecarboxaldehyde and 19.2 parts of N-(2-cyanoethyl)-N-(2-hydroxyethyl)-m-toluidine are reacted to yield 11 parts of the above-named compound as a gray powder. On oxidation this leuco dye produces a black dye which colors paper gray to black.

Any of the specific compounds of the invention previously mentioned hereinabove, especially those listed and numbered 1 to 29, can be prepared by the procedures set forth in the foregoing examples, especially Example 1.

EXAMPLE 9

The room temperature dark stabilities of light-sensitive compositions containing various leuco dyes of this invention (listed in Table I) were determined in each of the three following systems:

System A.—A 2.6 sq. in. section of Whatman No. 1 filter paper is treated with 0.25 ml. of a solution 12.5 × $10^{-3}$ molar in the leuco dye and 25 × $10^{-3}$ molar in 1,2-dibromo-1,1,2,2-tetrachloroethane in 50/50 by volume N,N-dimethylformamide/benzene solution and dried at room temperature. Each square inch of the dried paper contains about 0.5 mg. of leuco dye and 0.8 mg. of 1,2-dibromo-1,1,2,2-tetrachloroethane.

System B.—The same as A except the photooxidant is 2,2′ - bis(o - chlorophenyl) - 4,4′,5,5′ - tetraphenylbiimidazole, instead of the haloethane.

System C.—The same as A except the 1,2-dibromo-1,1,2,2-tetrachloroethane is replaced by a half molar equivalent of 2,2′-bis(o-chlorophenyl)-4,4′,5,5′-tetraphenylbiimidazole and zinc bromide is added to form a salt of the leuco dye. The zinc bromide concentration is 25 × $10^{-3}$ molar.

The papers are imagewise exposed to a 275 watt sun lamp to establish their normal color-forming ability, then stored in the dark under conditions simulating ordinary darkroom storage conditions to determine their room temperature dark stability. After two weeks' storage the papers are examined visually for change in the unexposed areas.

The results are tabulated below:

TABLE I

| Bis(4-diethylamino-o-tolyl) arylmethane;* aryl= | Color change during storage in systems | | |
|---|---|---|---|
| | A | B | C |
| 2-thienyl | None | None | None. |
| 2,4-dimethoxyphenyl | do | do | Do. |
| 3,4-methylenedioxyphenyl | do | do | Do. |

*Zinc chloride double salt.

These results show that the photosensitive formulation, involving the leuco dyes of this invention, exhibit good room temperature dark stability. That there was no adverse effect due to storage is indicated by the fact the papers after storage developed their normally expected colors on exposure to light from a 275 watt sun lamp.

EXAMPLE 10

Photosensitive formulations, as acetone solutions, were prepared from the ingredients, including leuco dyes, listed below:

TABLE II.—IMAGING CAPABILITY AND STORAGE EFFECT

| Formulation containing leuco dye | o-Methyl groups | Before storage | | After storage | | | |
|---|---|---|---|---|---|---|---|
| | | | | 5 days percent decrease | | 3 weeks percent decrease | |
| | | Speed $s_{0.3}$ | $O.D._{50}$ | Speed $s_{0.3}$ | $O.D._{50}$ | Speed $s_{0.3}$ | $O.D._{50}$ |
| I | Yes | 529 | 1.13 | 20 | 14 | 52 | 38 |
| II | No | 794 | 1.03 | >60 | 49 | >80 | 50 |
| III | Yes | 444 | .90 | 28 | 12 | 61 | 34 |
| IV | No | 50 | .014 | >60 | 27 | >80 | 50 |
| V | Yes | 556 | 1.26 | 13 | 6 | 46 | 26 |
| VI | No | 50 | .008 | >60 | 38 | >80 | 50 |
| VII | Yes | 694 | .93 | 24 | 8 | 33 | 14 |
| VIII | No | 50 | .009 | >60 | 20 | >80 | 50 |

Ingredients: Weight, grams
- Acetone _____ 46.0
- Cellulose acetate-butyrate thermoplastic resin _____ 6.0
- p-Phenyl-phenol-ethylene oxide adduct (5.9 moles ethylene oxide) _____ 4.0
- 2,2'-bis(o-chlorophenyl) - 4,4',5,5' - tetrakis (m-methoxy phenyl)-biimidazole _____ 0.9358
- 7-diethylamino-4-methyl coumarin _____ 0.1389
- p-Toluenesulfonic acid monohydrate _____ 0.3424

Leuco dye to provide $9 \times 10^{-4}$ gram moles.

Leuco dyes employed

I. Bis(4-diethylamino-o-tolyl) - 3,4-methylenedioxyphenyl methane [1]
II. Bis(4-diethylaminophenyl) - 3,4-methylenedioxyphenyl methane
III. Bis(4 - diethylamino-o-tolyl) - 3,4 - dimethoxyphenyl methane [1]
IV. Bis(4 - diethylaminophenyl) - 3,4 - dimethoxyphenol methane
V. Bis(4-diethylamino-o-tolyl)-2-thienyl methane [1]
VI. Bis(4-diethylaminophenyl)-2-thienyl methane
VII. Bis(4-diethylamino-o-tolyl)-2-furyl methane [1]
VIII. Bis(4-diethylaminophenyl-2-furyl methane The formulations were applied to bleached sulfite coating paper and the acetone allowed to evaporate to give coatings about 0.5 mil thick. Samples of the coated papers were tested for imaging speed and final optical density development on exposure to light as described below. Unexposed samples were then stored individually in sealed bags in the dark at 45° C. for 5 days and for 3 weeks, and tested again.

A 2 x 2" square sample was exposed for 50 seconds to ultraviolet light from an Osram HBO-100-W/2 high pressure mercury arc lamp, filtered through a Schott UG-11 filter, directed perpendicularly to the plane of the paper, and having an irradiance of 0.90±0.02 milliwatt per square centimeter at the plane of the paper. Imaging speed measurements were obtained at the start of the exposure

[1] These are of this invention; the others are not.

by means of a calibrated phototube aimed to receive filtered light (via 620–660 millimicron narrow bandpass interference filter) from a visible lamp reflected at a 45° angle on the sample. The response of the phototube was plotted as optical density versus time and the imaging speed calculated as $S_{0.3}=1000/E_{0.3}$, where $E_{0.3}$ is the energy in millijoules per square centimeter (or 0.9 mw./cm.² × time in sec.) required to produce an optical density of 0.3 above background.

The optical density increase above background after the full 50 second exposure, $O.D._{50}$, was measured with a MacBeth densitometer.

The results are tabulated below in Table II:

The results show that compared to the prior art leuco dyes which do not contain ortho-substituents, the above-named leuco dyes of this invention provide photo-imaging compositions that (1) have significantly enhanced imaging speeds and optical density capability and (2) are more resistant to loss of their overall imaging utility under aggravated thermal storage conditions.

EXAMPLE 11

Leuco dyes of this invention ($R_3$=methyl) and of the prior art ($R_3$=H),

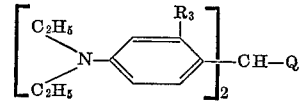

where

Q=2-thienyl and 3,4-dimethoxyphenyl, and
$R_3$=hydrogen or methyl were oxidized to the corresponding dyes, isolated as the zinc chloride salts.

The dyes were then compared as to the neutrality of their shades in terms of their (1) visible absorption spectra, (2) paper dyeing and (3) C.I.E. tristimulus values, and the results are set forth in Table III.

TABLE III.—VISIBLE ABSORPTION SPECTRA

| Dye | | Short wavelength, max. mu | Long wavelength, max. mu | Short/long relative intensity, $\epsilon_1/\epsilon_2$ |
|---|---|---|---|---|
| Q | Ortho-methyl | | | |
| 2-thienyl | No | 465 | 624 | .333 |
| 2-thienyl | Yes | 488 | 660 | .406 |
| 3,4-dimethoxyphenyl | No | 480 | 606 | .286 |
| 3,4-dimethoxyphenyl | Yes | 500 | 635 | .452 |

These absorption data show the ortho-methyl substituents of the subject dyes (1) bathochromically shift the short wavelength maximum 20 to 30 mμ,
(2) bathochromically shift the long wavelength maximum 29 to 36 mμ, and
(3) substantially increase the relative intensities of the short and long wavelength bands.

All these changes tend to cause the dyes of this invention to absorb light more uniformly throughout the visible spectrum so that (as discussed above in the section entitled "Background of the Invention; Description of the Prior Art") they appear blacker than the prior art dyes which are devoid of the ortho-methyl groups.

Dyeings

The dyes tabulated immediately above were dyed on paper as follows: A 0.01 molar methanol solution was spotted on Whatman No. 1 filter paper with an eye dropper and the paper allowed to dry. In each case the ortho-methyl substituted dye of this invention gave substantially neutral (grey-black) shades. The prior art compounds gave substantially green-colored dyeings.

C.I.E. (Committee International d'Eclairage)

To further characterize these shades, their tristimulus values (designated $x$ and $y$ in the table below) were determined for plotting on a C.I.E. chromaticity diagram according to the method of K. L. Kelly, Journal of Research, National Bureau of Standards 31 274 (1943). This method establishes the relationship of a dye to a neutral shade zone as defined by Kelly and compares its degree of neutrality again in C.I.E. standard illuminant "C."

Dyes defined by $x$ and $y$ values that fall within the irregularly shaped locus are "principally neutral" colors or colors which can be given no color name or hue name and those which are nearest to the C.I.E. standard illuminant "C" are nearest to black.

The $x$ and $y$ values of each test dye were calculated from the red (R), green (G), and blue (B) reflectance values of the dyed samples using a Colormaster Differential Colormeter and the following relationships:

$$x = \frac{.8R + .2B}{1.2B + .8R + G}$$

$$y = \frac{G}{1.2B + .8R + G}$$

These data are tabulated below in Table IV. Plotting the values on the chromaticity diagram establishes that the dyes of this invention are substantially more neutral than those of the prior art.

TABLE IV

| Dye | | Percent reflectance | | | | |
|---|---|---|---|---|---|---|
| Q | Ortho-methyls | R | G | B | $x$ | $y$ |
| 2-thienyl | No | 8.92 | 12.60 | 12.97 | 0.275 | 0.357 |
| Do | Yes | 9.47 | 10.86 | 13.07 | 0.299 | 0.318 |
| 3,4-dimethoxyphenyl | No | 11.06 | 13.94 | 17.88 | 0.201 | 0.350 |
| 3,4-dimethoxyphenyl | Yes | 12.60 | 13.89 | 20.54 | 0.292 | 0.286 |

The preceding representative examples may be varied within the scope of the present specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound selected from the class consisting of
(A) a leuco dye represented by the formula

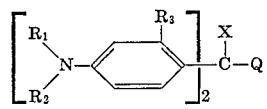

wherein $R_1$ and $R_2$ are selected from the group consisting of $C_1$ to $C_{12}$ alkyl, 2-cyanoethyl, 2-hydroxyethyl, 3-hydroxypropyl, $C_1$ to $C_4$ alkoxy ($C_1$ to $C_4$) alkyl, $C_7$ to $C_{12}$ aralkyl and $C_6$ to $C_{14}$ aryl;
$R_3$ is selected from the group consisting of methyl, ethyl and fluorine;
X is selected from the group consisting of hydrogen, hydroxy and cyano; and
Q is selected from the group consisting of 2-thienyl, 2-furyl, 3,4-methylenedioxyphenyl, 2-methoxy-4-($C_1$ to $C_8$) alkoxyphenyl, and 3,4-di ($C_1$–$C_8$) alkoxyphenyl; and
(B) salts thereof with organic and inorganic acids.

2. A compound according to claim 1 wherein $R_3$ is methyl.

3. A compound defined as in part (A) of claim 1.

4. A compound of claim 3 wherein $R_3$ is methyl, and $R_1$ and $R_2$ are each lower alkyl.

5. A compound defined as in part (B) of claim 1 represented by the formula

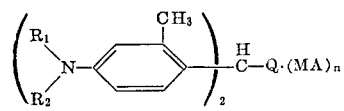

wherein Q, $R_1$, and $R_2$ are defined as in claim 1; M is hydrogen or zinc, A is an anion derived from an organic or inorganic acid and $n$ is an integer 1 or 2.

6. A compound according to claim 5 wherein $R_1$ and $R_2$ are each lower alkyl.

7. A cationic dye represented by the formula

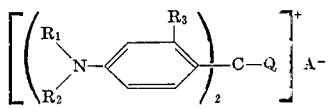

wherein $R_1$ and $R_2$ are selected from the group of consisting of $C_1$ to $C_{12}$ alkyl, 2-cyanoethyl, 2-hydroxyethyl, 3-hydroxypropyl, $C_1$ to $C_4$ alkoxy ($C_1$ to $C_4$)-alkyl; $C_7$ to $C_{12}$ aralkyl and $C_6$ to $C_{14}$ aryl; $R_3$ is selected from the group consisting of methyl, ethyl and fluorine; Q is selected from the group consisting of 2-thienyl, 2-furyl, 3,4-methylene-dioxyphenyl, 2-methoxy-4-($C_1$ to $C_8$) alkoxyphenyl, and 3,4-di-($C_1$–$C_8$) alkoxyphenyl; and $A^-$ is an anion derived from an organic or inorganic acid.

8. A compound according to claim 7 wherein $R_3$ is methyl, and $R_1$ and $R_2$ are each lower alkyl.

9. The compound of claim 3 having the name bis (p-diethylamino-o-tolyl) (3,4-methylenedioxyphenyl) methane.

10. The compound of claim 3 having the name bis(4-diethylamino-o-tolyl)2-thienylmethane.

References Cited

Noelting: C.A. 4, 1482 (1910).
Renshaw et al.: JACS 44: 862–4 (1922).
Jacobs et al.: JACS 44: 2626–8 (1922).
Mason et al.: J. Org. Chem. 16: 722, 726 (1951).
Venkataraman: The Chemistry of Synthetic Dyes (Academic Press, New York, 1952), vol. I, pp. 346–8, vol. II, p. 713.

HENRY R. JILES, *Primary Examiner.*

C. M. SHURKO, *Assistant Examiner.*

U.S. Cl. X.R.

8—2, 7, 12, 54, 54.2, 55; 106—14.5, 22, 23, 288, 292; 260—332.3, 332.5, 340.5, 347.2, 347.7, 393, 570